(12) United States Patent
Hellriegel

(10) Patent No.: US 6,570,429 B1
(45) Date of Patent: May 27, 2003

(54) METHOD AND APPARATUS FOR PROVIDING A CLOCK SIGNAL TO A SEMICONDUCTOR CHIP

(75) Inventor: Stephen V. R. Hellriegel, Bainbridge Island, WA (US)

(73) Assignee: Cray Inc., Seattle, WA (US)

( * ) Notice: Subject to any disclaimer, the term of this patent is extended or adjusted under 35 U.S.C. 154(b) by 0 days.

(21) Appl. No.: 09/693,546

(22) Filed: Oct. 20, 2000

(51) Int. Cl.$^7$ .................................................. H03K 3/00
(52) U.S. Cl. ...................... 327/295; 327/293; 327/564; 327/565; 257/778; 257/779
(58) Field of Search ................................ 327/291, 293, 327/295, 564, 565; 257/702, 737, 779, 780, 778

(56) References Cited

U.S. PATENT DOCUMENTS

| | | | | |
|---|---|---|---|---|
| 4,926,066 A | * | 5/1990 | Maini et al. ................. | 327/565 |
| 5,140,184 A | * | 8/1992 | Hamamoto et al. ......... | 327/295 |
| 5,281,151 A | * | 1/1994 | Arima et al. ................. | 439/68 |
| 5,375,042 A | * | 12/1994 | Arima et al. ................ | 361/784 |
| 5,546,297 A | * | 8/1996 | Duley ......................... | 327/565 |
| 5,656,963 A | * | 8/1997 | Masleid et al. .............. | 327/292 |
| 5,691,662 A | * | 11/1997 | Soboleski et al. ........... | 327/292 |
| 6,037,820 A | * | 3/2000 | Ishizaka ...................... | 327/295 |
| 6,043,704 A | * | 3/2000 | Yoshitake .................... | 327/295 |

* cited by examiner

*Primary Examiner*—Timothy P. Callahan
*Assistant Examiner*—An T. Luu
(74) *Attorney, Agent, or Firm*—Seed IP Law Group PLLC

(57) ABSTRACT

A clock distribution tree for use with a semiconductor chip. The package for a semiconductor chip includes a clock distribution tree having a plurality of output terminals for connection to a plurality of input pads on a semiconductor chip. According to one embodiment, the semiconductor chip includes a clock receiving and conditioning circuit which is coupled to a clock input signal line. The clock receiving and conditioning circuit receives a clock signal, filters it, amplifies it and outputs it back to the package having a clock distribution tree thereon. The clock distribution tree thereafter distributes the clock signal to the appropriate locations of the semiconductor chip through clock output terminals coupled to clock input paths on the semiconductor chip.

25 Claims, 3 Drawing Sheets

METHOD AND APPARATUS FOR PROVIDING A CLOCK SIGNAL TO A SEMICONDUCTOR CHIP

TECHNICAL FIELD

This invention relates to providing a clock signal on a chip, and more particularly to a clock distribution tree on a circuit board.

BACKGROUND OF THE INVENTION

Electronic circuits often operate at a selected clock rate. With each clock edge, the circuits may perform the next set of instructions, or advance to the next stage or perform some other operation, according to the design of the circuit.

Within an integrated circuit, it is desirable to have all circuits on the same chip operating on a known phase relationship to each other. Many times, it is preferred to have all circuits operate on exactly the same clock phase so that all events happen in the same time relationship to each other on the entire chip. On other circuits, it is desirable to have some events happen slightly delayed from other events so that the relative timing between the two is exactly known. In each case, knowing the exact clock timing is often important to ensure proper circuit operation.

On a semiconductor chip, when circuits are spaced apart from each other a clock signal which originates closer to one circuit than the other will arrive at the closer circuit first. Even with an electrical signal moving at the speed of light, the difference in time between when a clock signal arrives at one circuit as compared to another circuit can be significant, especially with high speed circuits now being constructed in microprocessors.

SUMMARY OF THE INVENTION

According to principles of the present invention, a circuit and method are provided for ensuring that the clock signal is uniformly provided to the entire semiconductor chip at one time. A clock signal distribution tree is provided on the support which holds the semiconductor chip. The support may be in the form of a printed circuit board, a ceramic package or some other supporting support. The support board includes very low resistance, thick metallic lines so that the clock signal travels, with very low losses and low noise to all the clock input pins on the semiconductor chip.

According to one preferred embodiment, a main clock signal is provided to the board supporting the semiconductor chip. The clock signal is output from the board to the semiconductor chip to a clock conditioning circuit. The clock conditioning circuit on the semiconductor chip amplifies the clock signal and filters out noise which may be present on the clock signal line. The clock circuit outputs the conditioned clock signal back to the board to a clock signal distribution tree. The clock signal is then distributed on the clock signal tree on the board to numerous clock signal terminals. The clock signal terminals are coupled to the semiconductor chip at clock input pads. The distance from the clock input terminal to each of the clock output terminals is identical. Accordingly, the clock signal is assured of arriving at exactly the same time at each of the clock input pads on the semiconductor chip.

DETAILED DESCRIPTION OF THE INVENTION

Figure 1:
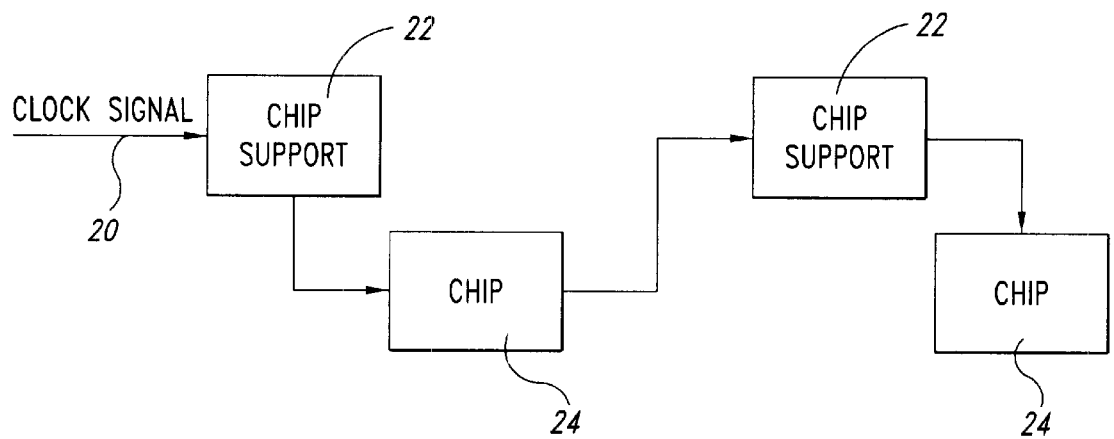
FIG. 1 is a block diagram illustrating delivery of a clock signal according to principles of the present invention.

FIG. 1 illustrates a clock signal line 20 which delivers a clock to a chip support board 22. The support board 22 may take the form of an organic circuit board, a ceramic circuit board, a socket, a package, or some other acceptable package for supporting and providing electrical connection to the chip. The chip support board 22 is electrically connected to the semiconductor chip 24 via the appropriate input terminal.

The chip 24 contains thereon a clock receiving circuit 36. (See FIG. 3.) The clock receiving circuit 36 includes the appropriate input buffers for receiving a clock signal. The chip also includes a clock conditioning circuit which conditions and filters the clock signal. For example, the clock conditioning circuit includes, in one embodiment a filter to remove noise from the clock signal. The clock filter circuit may, for example, ensure that the transitions from high to low and from low to high in the clock are at a selected slope having a desired rise time and fall time on each clock pulse. It may perform the function of improving the rise time and fall time of each clock pulse as part of the filtering circuit. The clock conditioning circuit 36 also includes an amplifier circuit which increases the power of the clock signal.

Clock conditioning circuits are well known in the art and numerous such circuits are available in many design books. Any of the many known and widely used clock conditioning circuits can be used within the context of the present invention. Each individual chip may have slightly different needs for the clock conditioning circuit and, from those many circuits which are known and available in the art the one which best suits the needs for a particular chip can be selected and used as desired.

The output of the clock conditioning circuit 36 is connected back to the support board 22 for distribution into the chip at a different location. As explained in more detail with respect to FIGS. 3 and 4, the support 22 contains a large number of highly conductive, low resistance signal lines for carrying the clock signal to different locations on the chip. Since these signal lines are formed on the package, they can be made significantly larger, and have much lower resistance than clock distribution lines on the chip itself. Accordingly, the clock signal lines on the support 22 distribute the clock signal to desired locations having a plurality of clock output terminals which provide the clock signal itself to the clock input terminals on the semiconductor chip 24. When the clock signal is received at the semiconductor chip 24, it is used to clock the various circuits on the chip in a manner known in the art.

Figure 2:
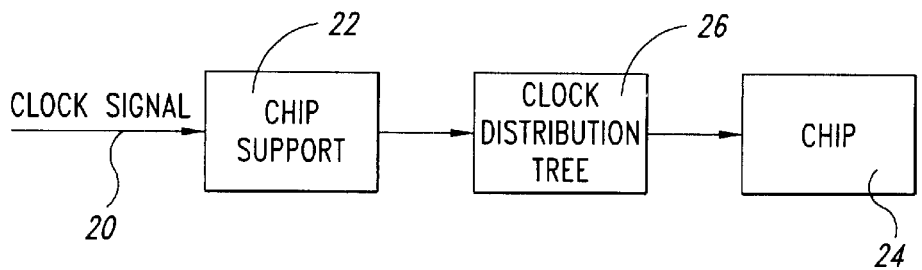
FIG. 2 is an alternative embodiment of providing a clock signal according to principles of the present invention.

FIG. 2 illustrates another embodiment of the present invention. According to the embodiment of FIG. 2, a clock signal is provided to a support board 22 having a semiconductor chip thereon. When the clock signal has been received at the support for the semiconductor chip, it is placed on a clock distribution tree 26 having multiple conductors. The clock distribution tree 26 has a number of output terminals which provide the clock signal at each respective output terminal. The output terminals of the clock distribution tree 26 are connected to respective input terminals for the clock of the semiconductor chip 24. One embodiment of FIG. 2 is similar to the embodiment of the FIG. 1 except that the chip 24 does not include a clock conditioning circuit. Rather, the clock signal is provided to the chip package 22 and enters the clock distribution tree directly without first entering the chip. According to a second embodiment of FIG. 2, the clock signal itself originates with the chip 24. Many chips today, particularly microprocessors, have a clock generation circuit. This may include a crystal connected to two pins and the circuits need to obtain oscillation signals from the crystal. Such circuits produce a clock signal and the chip 24 itself. According to this embodiment of the invention, the on-board clock signal is generated by the chip, it is output onto clock signal line 20 to the chip support board 22. The clock signal is distributed to various portions of the board 22 and then input back into the chip at desired locations, based on the shape and pattern of the clock distribution tree 26.

Figure 3:
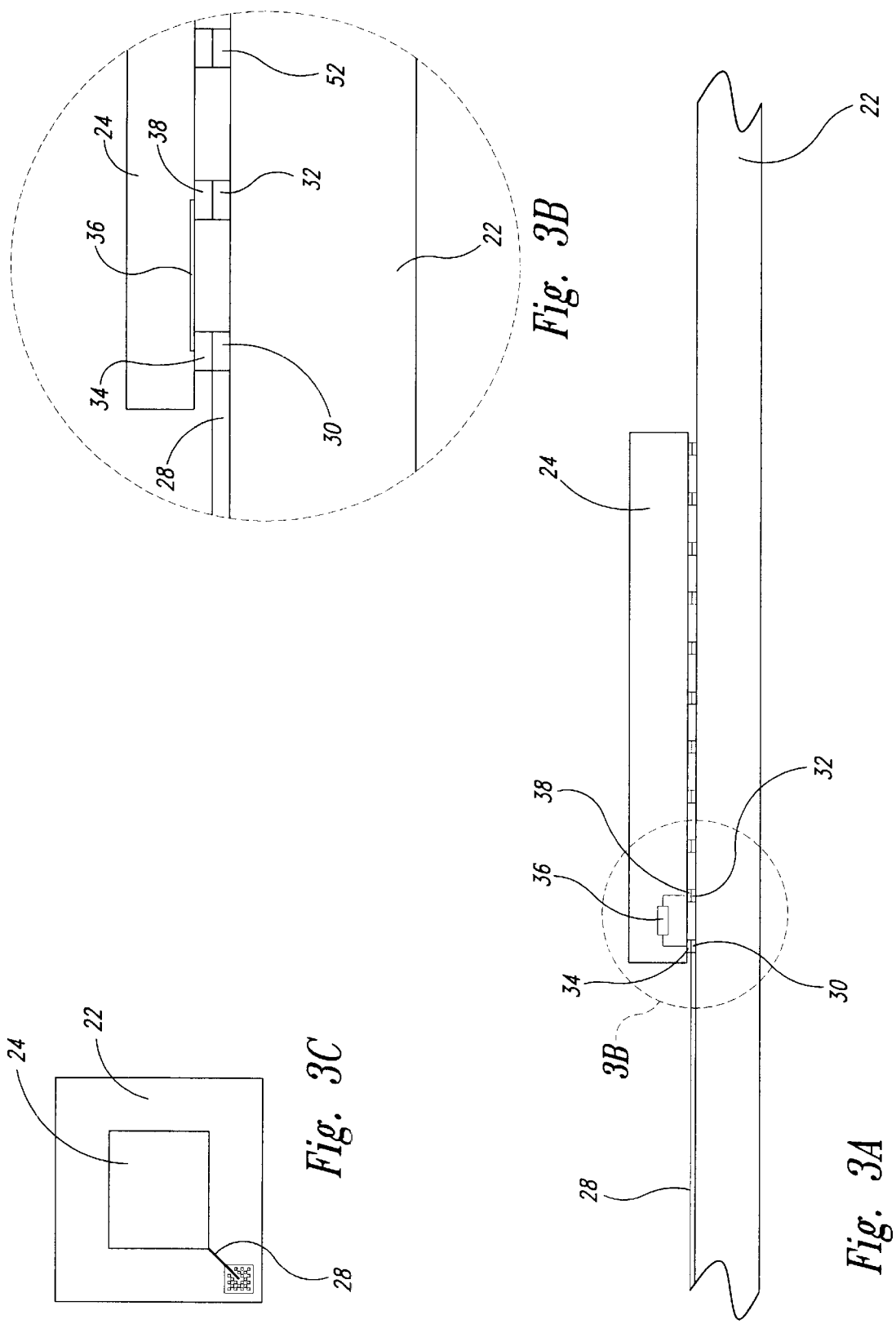
FIG. 3A is a side elevational view of the package in a semiconductor chip according to principles of the present invention.
FIG. 3B is an enlarged view of a portion of FIG. 3A.
FIG. 3C is a top plan view of FIG. 3A.

FIG. 3 is a side elevational view of one embodiment of the support 22 and chip 24 according to principles of the present invention. A clock input line 28 is formed on the support 22. As previously stated, the package 22 may be a ceramic board of various layers having conductive and insulative layers alternatingly positioned therein. Alternatively, the support 22 may be a package, an organic board, a printed circuit board, a socket or some other acceptable package for supporting the semiconductor chip 24. The clock signal input line 28 includes an input terminal 30 positioned on the package 22. The semiconductor chip includes a clock receiving pad 34 coupled to the clock input terminal 30. The semiconductor chip 24 also includes therein a clock receiving and conditioning circuit 36. As previously described, the clock receiving and conditioning circuit 36 can be any acceptable circuit used in the art. The clock conditioning circuit 36 includes an output pad 38. The output pad 38 is coupled to a clock receiving terminal 32 positioned on the printed circuit board. The clock receiving terminal 32 receives a condition clock signal from the pad 38 and distributes it to clock output terminals on the package 22 as best shown and described with respect to FIG. 4.

Figure 4:
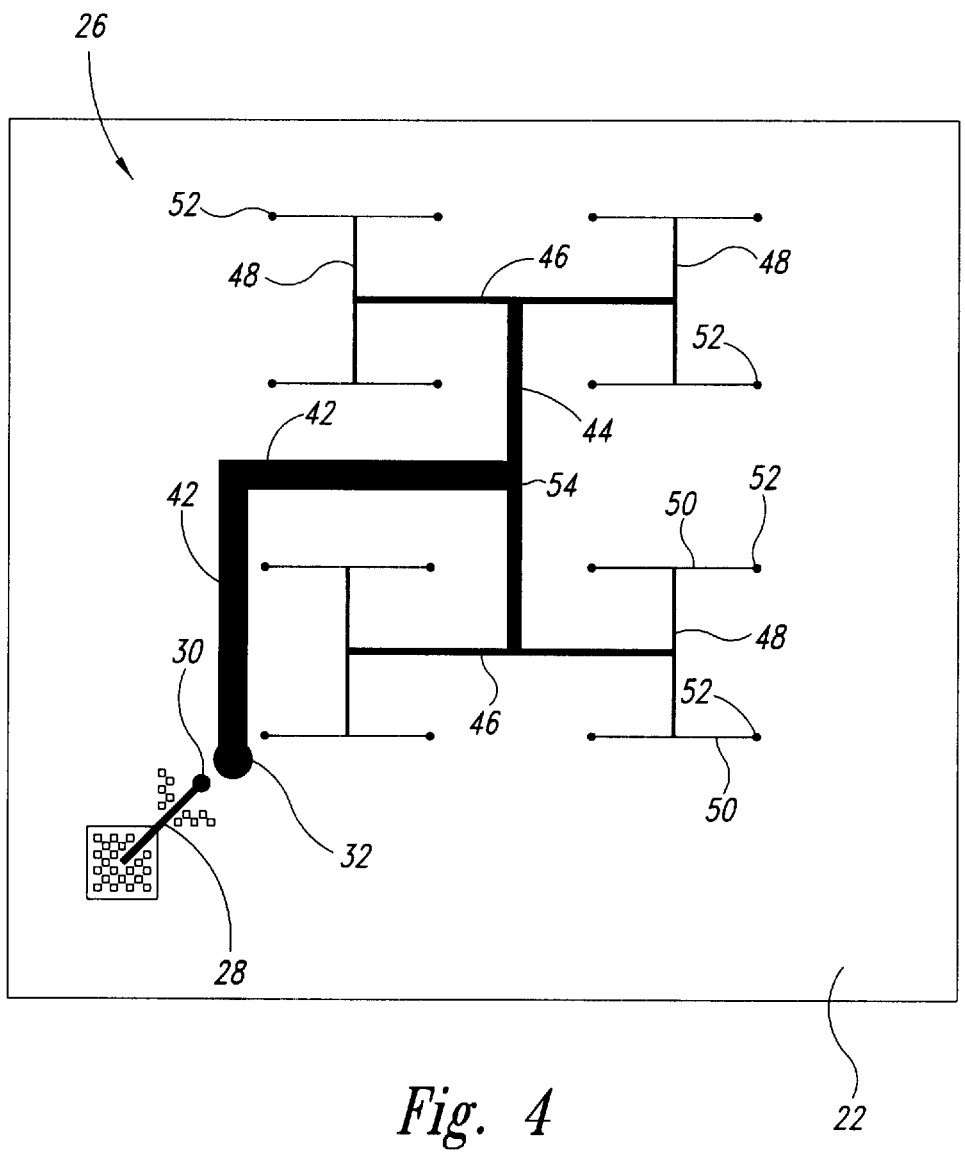
FIG. 4 is a top elevational view of a package having a clock signal line distribution tree according to principles of the present invention.

FIG. 4 shows one example of a clock distribution tree 26. Clock distribution tree 26 includes a highly conductive, low resistance, clock distribution line 42. The main clock distribution line 42 divides into two branches 44 each of which divide into respective branches 46 each of which divide into respective branches 48. If desired, and as shown in FIG. 4, clock branches 28 may be further divided to branches 50 providing clock output terminals 52 at the termination of each of the branches.

As will be appreciated, the number of branches in the clock distribution tree are variable and can be selected according to the desired design. In one embodiment, the clock distribution tree includes only a first branch 44 and has, at the ends of branch 44 the clock output terminals 52. Alternatively, the clock output terminals could be positioned at the ends of branches 46 so as to provide four clock output terminals, or at the end of both branches 44 and 46, so as to provide six clock output terminals. According to the embodiment as shown in FIG. 4, sixteen clock output terminals are provided since four branches are provided with an output node only at the ends of each.

The particular shape, and design of the clock distribution tree 26 is selected according to the desired design and many acceptable shapes and designs fall within the concept of the present invention. According to the embodiment shown in FIG. 4, the tree is a regular pattern with all branches having exactly the same length as each other and precisely made so that each clock output terminal 52 is positioned at the end of a branch and an exact distance from the center of the chip 54 where the main trunk 42 meets branch 44. The exact distance of each of the clock output terminals 52 is selected based on the semiconductor chip pad to which it is connected. As can be appreciated, for different clock speeds or different semiconductor circuit operations more or fewer terminating pads may be required to ensure that the circuits appear to receive the clock signal simultaneously with respect to each other.

The tree 26 design according to the embodiment of FIG. 4 is that of an H tree, with straight branches creating the form of a "T" from the prior branches. In a further alternative embodiment, the clock distribution tree is a starburst pattern having the clock input terminal 30 at the center of the chip, the clock conditioning circuit at the center of the chip and then outputting the distribution of the clock in a starburst pattern to the various clock output terminals 52. Accordingly, any acceptable clock distribution tree pattern according to the needs of the semiconductor chip is acceptable, which provides that all end points are equal distance and equal impedance from the source.

Preferably, clock input terminals are spaced from each other equal distance so that all relevant circuits on the chip receive a clock at a known time. In an alternative embodiment, the clock distribution tree has terminals spaced different distances from each other so that the clock is provided a known, preset time at each input terminal of the chip for precise control of chip operation of one clock relative to the other.

The clock signal line 42 is a very low resistance, highly conductive line. It is preferably composed of a very highly conductive metal or metal alloy. For example, it may be composed of a gold or gold alloy. Alternatively, it may be composed of a copper, copper alloy, silver, silver alloy, or some other highly conductive metal with very low noise qualities and low losses. The main trunk line 42 is composed of a thick, wide metal so as to provide a very low resistance, high current path as needed. At the central location 54, the main trunk 42 connects to the first branch 44. The first branch 44 is specifically designed to have equal length on each side of the central connection point 54 with the main trunk 42. It, likewise is composed of a low resistance, low loss, low noise and highly conductive metal. Similarly, clock signal lines 46, 48 and 50 are also composed of a low resistance, highly conductive metal line. Preferably, all metal lines in the clock distribution tree 26 are composed of the same metal and forms simultaneously, in the same metallic layer in the support 22.

Each of the lines forming the distribution tree designed having a selected impedance with respect to the other lines. The impedance is matched throughout the tree to ensure that the clock signal arrives at exactly the same time, and exactly the same phase at each distribution point. Preferably, the ratio of impedance is a geometric ratio by the power of two. If, for example line 50 has an impedance of X then line 48 will have an impedance of exactly half X. Thus, the signal traveling down line 48 will be divided, at the junction with line 50 exactly into two equal portions which will travel with equal power and speed to the terminus 52 at each of the two lines 50 at that end of line 48. The same occurs at the other side of line 48 for the other line 50 attached connected to the other side. Similarly, line 46 has an impedance which is one-fourth that of 48 and line 44 has an impedance which is one-eighth of that of 46. Preferably, this is achieved by making the lines of the same materials but having thicknesses which will also provide a power division exactly equal to the branches at each node. Thus, line 48 will be twice as thick as line 50, line 46 will be four times as thick as line 50, line 44 will be eight times as thick as line 50, and line 42 will be six times as thick as line 50. Thus, each split of the tree has a power divider and provides twice the impedance in the branch from the broader conductor fee in that particular branch, with this relationship extending from the input terminal 32 to the clock output signal 52.

Semiconductor circuits contain thereon conductive lines which carry data, power and as is well known in the art, clock signals. Normally, conductive lines on a semiconductor chip are composed of a metal which is compatible with the semiconductor support and the process used to make the semiconductor. One well known compatible conductor for a silicon support is the use of polysilicon heavily doped with an impurity. Doped polysilicon is a good conductor that is acceptable in many circuits, but compared to metal, polysilicon's resistance is significantly higher than metal's. A silicide, such as a tungsten silicide, molybdenum silicide or other metal alloy is often formed with the polysilicon on the semiconductor support in order to reduce the resistance and increase the conductivity. Since the conductive line is formed on the semiconductor support, the width of the line is severely limited so as to not occupy too much area on the semiconductor support. In addition, the height of the line is also limited based on the process parameters and the overall height of the various layers formed as part of the semiconductor chip. Accordingly, making an extremely low resistance line on the semiconductor support is difficult and expensive.

It is known to use various types of metal conductors on the semiconductor support, so long as they are compatible with the semiconductor material and process. For example, metals such as aluminum, titanium, aluminum copper alloys, various copper alloys and others, are all known to be used on a semiconductor support for providing conductive signal paths from one part of the semiconductor support to another. Currently, the use of such signal lines is well known in the art for clock and data signals. Recently, some companies have begun to use an alloy containing large amounts of copper in metal lines on a semiconductor chip so as to provide even lower resistance and faster speeds than was previously possible with aluminum. Nevertheless, each of the conductive lines which is formed on the semiconductor support, whether made of metal alloys, or doped semiconductor material suffers from the same problem of limited area which can be occupied on the semiconductor support together with limitations in the process by which the metal can be formed, and the thickness of the metal. All of these tend to limit the conductivity of a line which is formed as part of the semiconductor.

A support board 22 has significantly greater compatibility for the formation of low resistance, highly conductive lines than a semiconductor support. First, the area on the printed circuit board is not nearly so valuable as the real estate area of a semiconductor chip. Accordingly, the conductive lines can be made much wider, and significantly thicker than is possible on a semiconductor support. According to principles of the present invention, the clock distribution tree 40 is composed of lines which are thousands of times wider, and hundreds of times thicker than those presently used on a semiconductor substrate. A support 22 also has the advantage that a wider variety of metals may be used beyond those compatible with the semiconductor formation process. For example, some semiconductor processors are not compatible with the use of gold or gold alloys. Further, some semiconductor processes are not compatible with the use of copper, copper alloys and the like. On the other hand, the use of gold, copper and silver and alloys thereof are well known and easily accomplished on a package such as a ceramic support, organic printed circuit board or the like.

According to principles of the present invention, known and easily accomplished techniques are used for forming a signal distribution line on the package 22. This is combined with a clock receiving a conditioning circuit 36 and also with a clock distribution tree 40 for providing the high speed, low noise clock to multiple locations on the semiconductor chip.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. A method of providing a clock signal to circuits in a semiconductor substrate comprising:

providing a clock signal on a first clock signal line located on a chip support board;

inputting the clock signal from the first clock signal line on the chip support board to a first circuit on the semiconductor substrate;

conditioning the clock signal in the first circuit on the semiconductor substrate;

outputting the conditioned clock signal from the first circuit on the semiconductor substrate to a second clock signal line on the chip support board;

inputting the conditioned clock signal from the chip support board into a plurality of operating circuits on the semiconductor substrate.

2. The method of claim 1 wherein the chip support board is a ceramic type support.

3. The method of claim 1 wherein the chip support board is an organic printed circuit board having a plurality of layers coupled together with an adhesive.

4. The method of claim 3 wherein the adhesive is an epoxy type adhesive and the circuit board includes a plurality of fiberglass layers.

5. The method of claim 1 wherein the first clock signal line is a low resistance metal line comprised of an alloy having gold, copper, or silver as a metal in the alloy to provide a low resistance electrical conductor.

6. The method of claim 1 wherein the step of conditioning the clock signal includes:

amplifying the clock signal.

7. The method of claim 1 wherein the step of conditioning the clock signal includes:

filtering noise from the clock signal.

8. A semiconductor substrate and chip support board combination comprising:

a semiconductor substrate having a clock receiving pad, a clock output pad, and a plurality of clock input pads spaced from each other for receiving a clock signal;

a chip support board having thereon a clock input line, a clock input terminal, a clock receiving terminal, and a clock distribution tree having a plurality of branches and a plurality of clock output terminals wherein the clock receiving terminal is connected to the clock distribution tree and the plurality of clock output terminals are coupled to the plurality of clock input pads on the semiconductor substrate; and a clock conditioning circuit on the semiconductor substrate, being coupled between the clock receiving pad and the clock output pad on the semiconductor substrate, wherein the clock receiving pad on the semiconductor substrate is coupled to the clock input terminal on the chip support board, and the clock output pad on the semiconductor substrate is coupled to the clock receiving terminal on the chip support board.

9. The combination according to claim 8 wherein the clock output terminals are spaced equidistant from a central location on the chip support board such that a clock signal provided to the central location arrives simultaneously at each of the clock output terminals.

10. The combination according to claim 8 further including;
a clock pump circuit on the semiconductor substrate, the clock pump circuit being coupled to the clock input line.

11. The combination according to claim 10 further including;
a clock receiving line on the chip support board and positioned for connecting a clock signal to the clock pump circuit on the semiconductor substrate; and
the clock input terminal on the chip support board coupling the clock pump circuit to the clock input line.

12. The combination according to claim 8 wherein the chip support board is a printed circuit board and the clock input line is formed on the printed circuit board.

13. The combination according to claim 12 wherein the clock input line on the chip support board is composed of a low resistance metal alloy including a metal from the group of gold, copper or silver.

14. The combination according to claim 8 wherein the chip support board is composed of a ceramic material.

15. The combination according to claim 8 wherein the clock distribution tree has the plurality of branches, and the branches being all of equal length and each having clock output terminals at the end of the branch.

16. The combination according to claim 8 further including:
a clock generation circuit on the semiconductor substrate, the clock generation circuit providing the clock signal from the semiconductor substrate to the clock distribution tree on the chip support board.

17. A combination according to claim 8 wherein the clock distribution tree has a plurality of branches on the chip support board wherein a branch of the clock distribution tree more proximate to the clock receiving terminal than a coupled branch will have an impedance which is half the impedance of the more distant coupled branch.

18. A combination according to claim 8 wherein the clock distribution tree has a plurality of branches on the chip support board wherein the height of a branch that is more proximate to the clock receiving terminal is less than the height of a branch less proximate to the clock receiving terminal.

19. A combination according to claim 8 wherein the clock distribution tree has a plurality of branches on the chip support board wherein the width of a branch that is more proximate to the clock receiving terminal is greater than a branch that is less proximate to the clock receiving terminal.

20. A semiconductor substrate and chip support board combination comprising:
a semiconductor substrate having a clock receiving terminals thereon;
a chip support board having thereon a clock input line and a clock distribution tree having a plurality of branches having a plurality of clock output terminals wherein the clock input line is coupled to the clock distribution tree and the plurality of clock output terminals are coupled to the plurality of clock receiving terminals on the semiconductor substrate; and
a clock generation circuit on the semiconductor substrate having a clock output terminal wherein the clock output terminal is coupled to the clock input line on the chip support board.

21. A clock distribution tree comprising
a trunk of a clock distribution tree, the trunk having a first impedance;
a plurality of branches extending from the trunk of the clock distribution tree, the impedance of the trunk of the clock distribution tree being lower than the impedance of the branches from the clock distribution tree, and the ratio of the differences in impedance being selected based on the geometric ratio to the number of branches extending from the trunk.

22. The clock distribution tree according to claim 21 wherein two branches extend from the trunk and the ratio of impedance is a ratio of 2.

23. The clock distribution tree of claim 21 further including a plurality of second branches extending from the first plurality of branches, the second plurality of branches having a ratio of impedance to the first plurality of branches, the ratio being selected to achieve an equal phase and timing distribution of a signal through each of the branches.

24. A semiconductor substrate and chip support board comprising:
a semiconductor substrate having a clock receiving pad, a clock output pad, and a plurality of clock input pads spaced from each other for receiving a clock signal;
a chip support board having thereon a clock input line, a clock input terminal, a clock receiving terminal, and a clock distribution tree having a plurality of branches and a plurality of clock output terminals wherein the clock receiving terminal is connected to the clock distribution tree and the plurality of clock output terminals are coupled to the plurality of clock input pads on the semiconductor substrate; and
a clock conditioning circuit on the semiconductor substrate, the clock conditioning circuit being configured to receive a clock input signal of a first type and output clock signal of a second type, the signal of the second type having less noise than the signal of the first type, the clock conditioning circuit being coupled between the clock receiving pad and the clock output pad on the semiconductor substrate, wherein the clock receiving pad on the semiconductor substrate is coupled to the clock input terminal on the chip support board, and the clock output pad on the semiconductor substrate is coupled to the clock receiving terminal on the chip support board.

25. A semiconductor substrate and chip support board combination comprising:
a semiconductor substrate having a clock receiving terminals thereon;
a chip support board having thereon a clock input line and a clock distribution tree having a plurality of branches having a plurality of clock output terminals wherein the clock input line is coupled to the clock distribution tree and the plurality of clock output terminals are coupled to the plurality of clock receiving terminals on the semiconductor substrate; and
a clock generation circuit on the chip support board having a clock output terminal wherein the clock output terminal is coupled to the clock input line on the chip support board.

* * * * *